US008944737B2

(12) United States Patent
Black (10) Patent No.: US 8,944,737 B2
(45) Date of Patent: Feb. 3, 2015

(54) CONSTRUCTION SYSTEM, METHOD AND APPARATUS (76) Inventor: Gregory John Black, Newtown (AU)

(*) Notice: Subject to any disclaimer, the term of this patent is extended or adjusted under 35 U.S.C. 154(b) by 1585 days.

(21) Appl. No.: 12/086,607

(22) PCT Filed: Dec. 15, 2006

(86) PCT No.: PCT/AU2006/001917
§ 371 (c)(1),
(2), (4) Date: Sep. 21, 2010

(87) PCT Pub. No.: WO2007/068064
PCT Pub. Date: Jun. 21, 2007

(65) Prior Publication Data
US 2011/0008135 A1 Jan. 13, 2011

(30) Foreign Application Priority Data
Dec. 16, 2005 (AU) .................. 2005907092

(51) Int. Cl.
*E04G 21/18* (2006.01)
*B60P 1/00* (2006.01)
*B62D 53/06* (2006.01)
*B66F 3/46* (2006.01)
*E04H 7/06* (2006.01)
*E04B 1/35* (2006.01)

(52) U.S. Cl.
CPC .............. *E04G 21/1891* (2013.01); *B60P 1/00* (2013.01); *B62D 53/06* (2013.01); *B66F 3/46* (2013.01); *E04H 7/06* (2013.01); *E04B 1/35* (2013.01); *E04B 1/3522* (2013.01); *E04B 1/3527* (2013.01)
USPC .......................... 414/10; 254/93 R; 254/89 H (58) Field of Classification Search
USPC ......... 182/141; 248/205.1, 354.1, 354.3, 357; 254/133 A, 133 R, 93 R; 294/68.3, 67.1, 294/67.22, 67.33, 81.21; 405/288, 290; 414/10–12; 52/122.1, 126.1, 126.6, 52/169.9, 243.1, 301
See application file for complete search history.

(56) References Cited

U.S. PATENT DOCUMENTS

| 1,719,528 | A | * | 7/1929 | Beckley et al. | ................ 248/357 |
| 2,584,015 | A | * | 1/1952 | Hawes | .......................... 248/354.4 |
| 2,929,519 | A | * | 3/1960 | Taylor | .............................. 414/590 |
| 3,073,573 | A | * | 1/1963 | Haskins | ....................... 254/89 H |
| 3,115,754 | A | * | 12/1963 | Joseph | ............................ 405/297 |
| 3,427,773 | A | * | 2/1969 | Kandall | ...................... 52/223.12 |
| 3,743,120 | A | * | 7/1973 | Schmidt | .......................... 414/495 |
| 3,992,836 | A | * | 11/1976 | Mitra | .......................... 52/223.12 |

(Continued)

FOREIGN PATENT DOCUMENTS

| FR | 2540543 | 8/1984 |
| FR | 2871184 | 12/2005 |

(Continued)

*Primary Examiner* — Gregory Adams
(74) *Attorney, Agent, or Firm* — Dilworth & Barrese, LLP.

(57) ABSTRACT

A construction system, method and apparatus for erecting buildings and the like is disclosed. The construction system comprises a plurality of lifting rams (20) operatively coupled to a power source and a controller operatively coupled to the power source to control the lifting rams. A plurality of elongate, telescopic lifting rails (28) extending beneath a construction element or part thereof, such as conventional roof members (18), are also provided. Each lifting rail is coupled to at least one lifting ram of the plurality of lifting rams to elevate the construction element to a prescribed height.

16 Claims, 13 Drawing Sheets

(56) References Cited

U.S. PATENT DOCUMENTS

| | | | | |
|---|---|---|---|---|
| 4,058,952 A | * | 11/1977 | Donnelly | 52/745.02 |
| 4,067,448 A | * | 1/1978 | Bergeron, Jr. | 414/12 |
| 4,125,975 A | * | 11/1978 | Soble | 52/126.1 |
| 4,353,190 A | * | 10/1982 | Gleeson | 52/223.12 |
| 4,601,141 A | * | 7/1986 | Donnelly | 52/126.6 |
| 4,697,397 A | * | 10/1987 | Okuda et al. | 52/223.12 |
| 4,710,064 A | * | 12/1987 | Stafford et al. | 405/290 |
| 4,947,599 A | * | 8/1990 | Sadahiro | 52/223.12 |
| 5,839,239 A | * | 11/1998 | Jang | 52/123.1 |
| 6,027,295 A | | 2/2000 | Geppert et al. | |
| 6,389,766 B1 | * | 5/2002 | Jackson | 52/291 |
| 6,431,805 B2 | * | 8/2002 | Lanciaux, Jr. | 414/12 |
| 6,625,827 B1 | * | 9/2003 | Polevoy et al. | 5/203 |
| 2004/0129663 A1 | * | 7/2004 | Willim | 212/177 |

FOREIGN PATENT DOCUMENTS

| | | |
|---|---|---|
| JP | 06-185211 | 7/1994 |
| JP | 10-110544 | 4/1998 |
| JP | 11-200502 | 7/1999 |
| JP | 11-200631 | 7/1999 |
| WO | 03/062559 | 7/2003 |
| WO | 2004/065712 | 8/2004 |

* cited by examiner

CONSTRUCTION SYSTEM, METHOD AND APPARATUS

FIELD OF THE INVENTION

The present invention relates to an improved construction system, method and apparatus. In particular, but not exclusively, the present invention relates to a lifting system and method and an apparatus forming part thereof applicable to lifting a range of building features, such as roofs and floors. However, other applications are envisaged.

BACKGROUND TO THE INVENTION

The construction industry, as with many other industries, is always endeavouring to improve efficiency in construction techniques. Therefore, novel construction techniques that can achieve the same task and to the same standard as conventional techniques, but in a shorter time, are appealing. Alternatively or additionally, if fewer workers are required to complete the same task, labour costs can be reduced, thus increasing profits and/or improving competitiveness.

Other important considerations in the construction industry are workplace health and safety issues. Whilst improved efficiency is sought after, this should not be at the expense of the health and safety of workers.

Regarding the construction of buildings, Japanese patent application nos. 04336331, 10008071 and 10008072, all in the name of Sekisui House Ltd, disclose a construction method and system for building a house in which part of a roof and an external facing of a first or second floor are completed at ground level, for example, on a concrete foundation. A plurality of hydraulic cylinders situated on the foundation is coupled to a hydraulic pump and a control unit controls the synchronous lifting of the completed roof part and external facing to a predetermined height. Such a system and method enable the roof structure and external facings to be assembled at ground level, which is safer for workers and avoids the necessity of erecting scaffolding and edge protection. Furthermore, the assembled, elevated roof structure enables construction to continue beneath the roof, thus protecting both workers and building materials from the weather. Additionally, the aforementioned system and method are purported to reduce the completion time for the building.

Whilst the aforementioned system and method address some of the aforementioned efficiency and workplace health and safety issues in the construction industry, the aforementioned system employs complex hydraulic jacks and requires a number of workers to operate the system, particularly with the insertion of additional struts to extend the elevation reach of the jacks. The insertion of struts by workers during the elevation can also be dangerous. Also, the systems and methods employ I-beams as supports, which are heavy and require heavy duty lifting equipment to manoeuvre into position. Furthermore, the hydraulic jacks of these systems and methods are positioned inside the perimeter of the foundation thus requiring additional support around the perimeter. Therefore, additional equipment is required and use of the system requires a certain amount of space that may not be available on many sites. The complexity of these systems and methods adds to the preparation time which can negate the time benefits gained from the elevation process. It is envisaged that at least one working day with four people would be required to complete the elevation using these systems and methods. Another drawback is that temporary bracing of the roof structure would be required, which can damage the roof structure, thus necessitating replacement of the damaged parts. It is likely that replacement of the damaged parts will need to be carried out once the roof structure is at the prescribed height, which requires the scaffolding and edge protection the system and method was designed to avoid.

Further lifting systems, methods and apparatus are disclosed in U.S. Pat. No. 6,027,295 (Geppert et al.), WO 2004/065712 (The Mattamy Corporation), FR 2540543 (Lotti) and JP 10110544 (Kawasaki Heavy Industries Ltd). However, these systems, methods and apparatus all suffer from one or more of the aforementioned problems.

Hence, there is a need for a simplified, improved construction system and method, which retains the efficiency and workplace health and safety benefits of the system and method of the aforementioned prior art.

In this specification, the terms "comprises", "comprising" or similar terms are intended to mean a non-exclusive inclusion, such that a method, system or apparatus that comprises a list of elements does not include those elements solely, but may well include other elements not listed.

SUMMARY OF THE INVENTION

In one form, although it need not be the only or indeed the broadest form, the invention resides in a construction system comprising:
a plurality of lifting rams operatively coupled to a power source;
a controller operatively coupled to the power source to control the lifting rams; and
at least one elongate, telescopic lifting rail extending beneath a construction element, each lifting rail coupled to at least one lifting ram of the plurality of lifting rams to elevate the construction element to a prescribed height.

In another form, the invention resides in a method of construction including the steps of:
extending at least one elongate, telescopic lifting rail beneath a construction element or part thereof;
coupling each lifting rail to at least one lifting ram of a plurality of lifting rams, each said lifting ram coupled to a power source; and
elevating the construction element to a prescribed height by extending the plurality of lifting rams via a controller operatively coupled to the power source.

The construction element may be a roof structure or a floor structure or part thereof or a combination thereof.

The lifting rams may be hydraulic, pneumatic, electrical or mechanical lifting rams. Consequently, the power source may be a hydraulic pump, pneumatic pump or a generator.

Preferably, each elongate lifting rail comprises at least one mounting element for receiving and engaging part of the construction element.

Preferably, the system further comprises a detachable mounting bracket for coupling each elongate lifting rail to at least one lifting ram.

Preferably, each elongate lifting rail further comprises a tensioning device for pre-stressing the elongate lifting rail prior to receiving a load.

Suitably, the tensioning device comprises at least one cable or chain extending between two separated points along the length of the elongate lifting rail, such as opposing end regions of the elongate lifting rail and a tensioning member intermediate the two separated points for varying tension in the at least one cable or chain.

The system may further comprise one or more scissor lifts beneath each elongate lifting rail to provide additional support and stability.

Further features of the present invention will become apparent from the following detailed description.

BRIEF DESCRIPTION OF THE DRAWINGS

By way of example only, preferred embodiments of the invention will be described more fully hereinafter with reference to the accompanying drawings, wherein.

DETAILED DESCRIPTION OF THE INVENTION

Figure 1:
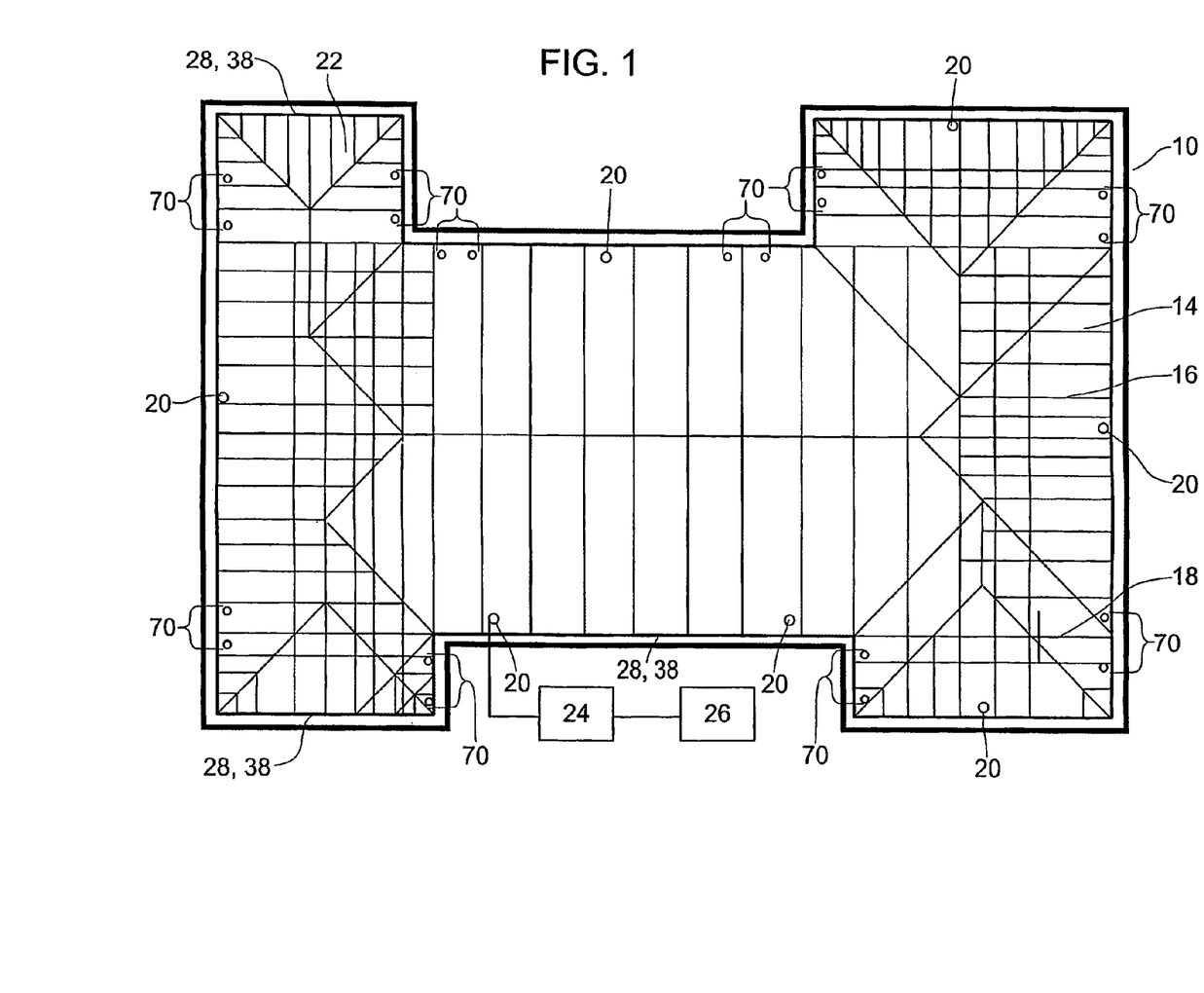
FIG. 1 is a schematic plan view illustrating a construction system according to an embodiment of the present invention.

Referring to FIG. 1, there is provided a construction system 10 according to an embodiment of the present invention. FIG. 1 shows a plan view of a construction element 14 in the form of a roof structure 16 for a building such as a house. Roof structure 16 comprises conventional roof members 18, such as trusses, purlins and the like and can be constructed at ground level.

The construction system 10 comprises a plurality of hydraulic lifting rams 20 mounted on a foundation 22 of the building. The plurality of hydraulic lifting rams 20 are operatively coupled to a power source in the form of a hydraulic pump 24 by a conventional hydraulic flow circuit and a controller 26 is operatively coupled to the hydraulic pump 24 to control the hydraulic lifting rams 20. For the sake of clarity, only one of the hydraulic lifting rams 20 is shown in FIG. 1 as operatively coupled to the hydraulic pump 24, but it will be appreciated that each hydraulic lifting ram 20 is operatively coupled to the hydraulic pump 24. Each hydraulic lifting ram 20 can be coupled to a control valve manifold assembly (not shown) and have associated stroke sensors and check valves (both not shown) as would be familiar to one familiar with synchronised hydraulic lifting systems.

Figure 2:
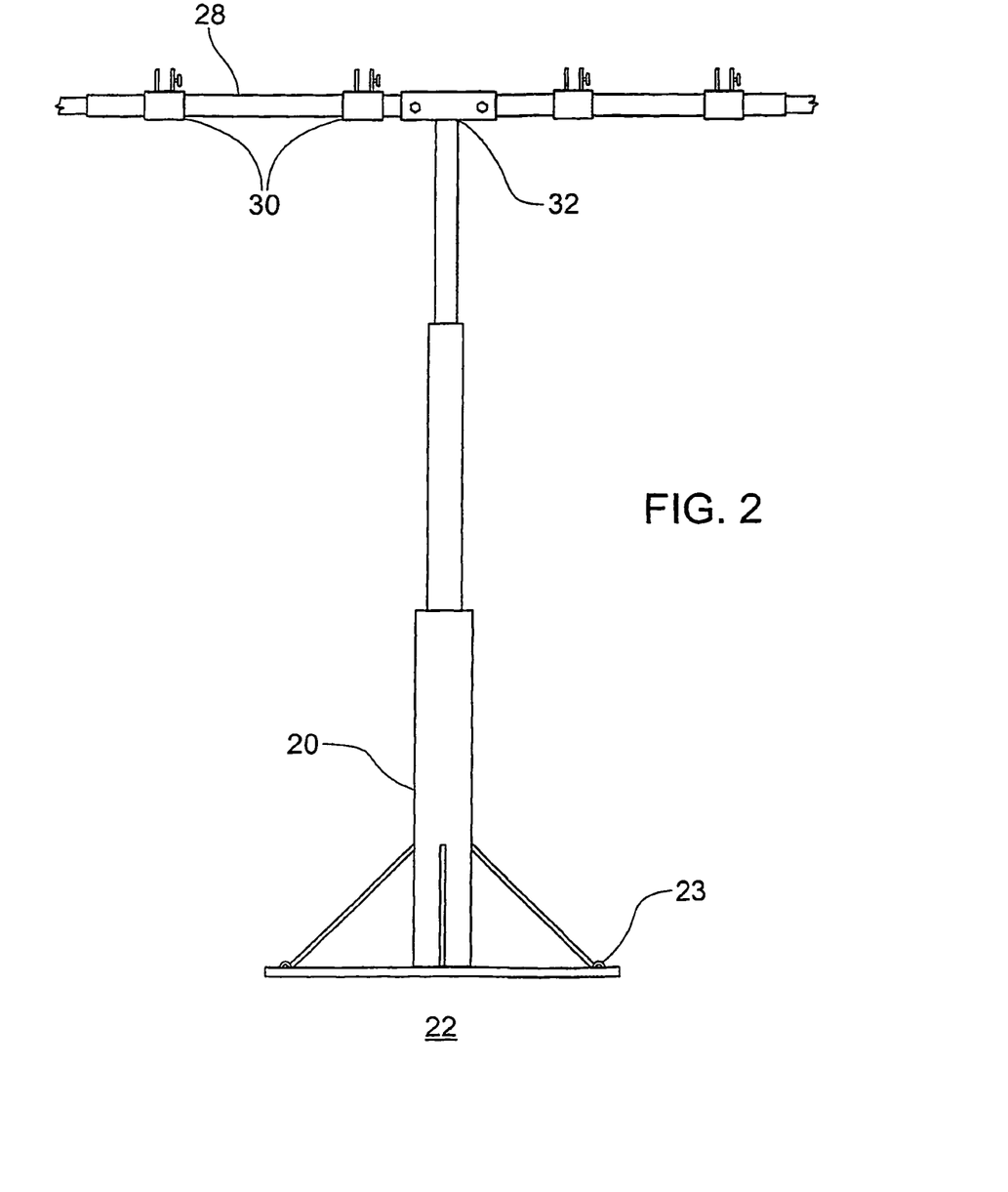
FIG. 2 is a side view of a lifting rail and a lifting ram for the system shown in FIG. 1.

With additional reference to FIG. 2, the construction system 10 also comprises at least one elongate lifting rail 28 extending beneath the construction element 14 in the form of the roof structure 16 or part thereof. In a preferred form of the present invention, a plurality of lifting rails 28 are provided and each lifting rail 28 is coupled to at least one hydraulic lifting ram 20 of the plurality of hydraulic lifting rams. The hydraulic lifting rams 20 synchronously elevate the construction element 14 supported by the plurality of lifting rails 28 to a prescribed height.

In FIG. 1, an example of suitable locations for the lifting rams 20 (SRS), the lifting rails 28 (TBR), scissor lifts (SLS) and tensioning devices as described later herein are shown for the building example in FIG. 1. However, it will be appreciated that the locations of the elements of the construction system of the present invention will vary according to the shape and type of structure being constructed.

With reference to FIG. 2, a hydraulic lifting ram 20 is secured to a foundation 22 by any suitable means known in the art, such as bolts 23 or other suitable fasteners. The ram 20 supports the elongate lifting rail 28 by means of a detachable mounting bracket 32 coupled between the elongate lifting rail 28 and the hydraulic lifting ram 20.

According to one embodiment, the elongate lifting rail 28 is telescopic to enable the lifting rail to be extended or contracted as required to fit beneath and support the appropriate part of the construction element 14. Each elongate lifting rail 28 comprises at least one mounting element 30 for receiving and engaging part of the construction element.

Figure 3:
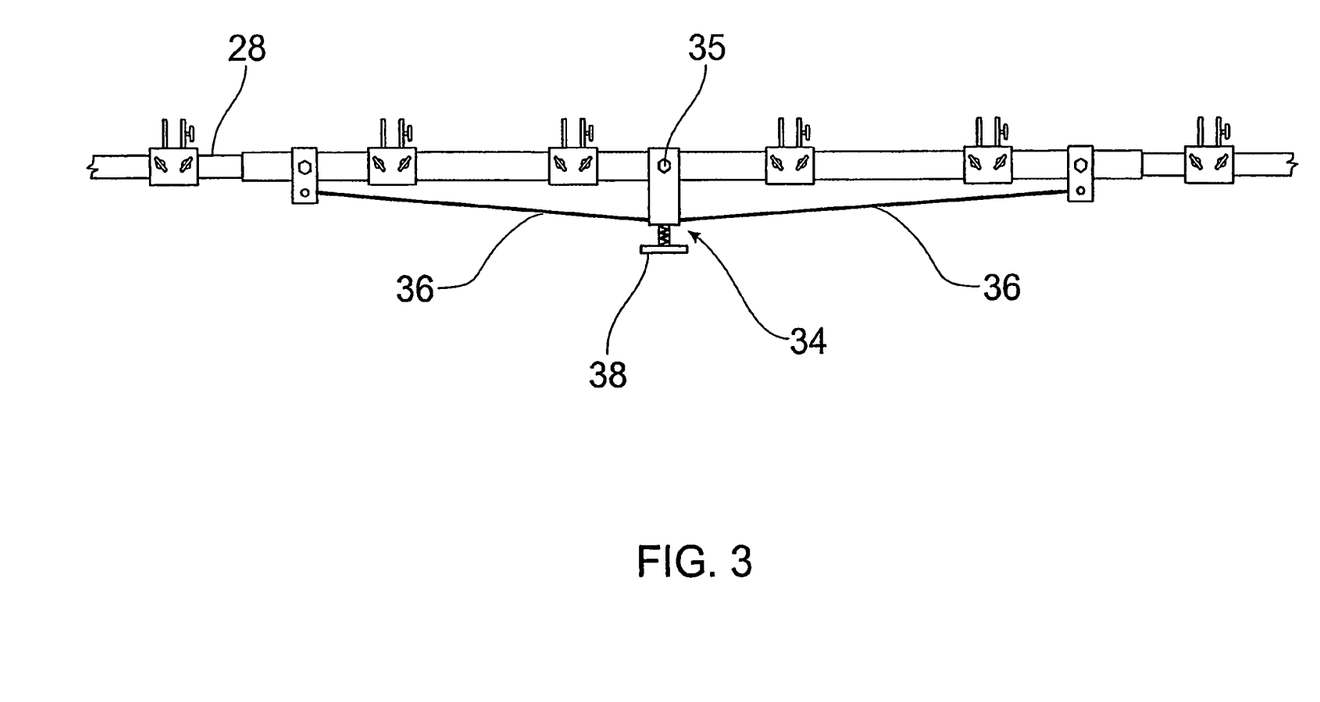
FIG. 3 is a side view of a tensioning device for the lifting rail of FIG. 2.

Referring to FIG. 3, according to one embodiment, each elongate lifting rail 28 comprises a tensioning device 34 for pre-stressing the elongate lifting rail 28 prior to receiving a load. The tensioning device 34 is movable along the length of the lifting rail 28 and is secured in position by a locking element 35, such as a locking nut. In one embodiment, the tensioning device 34 comprises at least one cable or chain 36 extending between two separated points along the length of the lifting rail 28. The two separated points can be opposing end regions of the elongate lifting rail or other points along the length of the rail 28. The tensioning device 34 is located intermediate the two separated points. The tensioning device 34 also comprises a tensioning member 38 for varying tension in the at least one cable or chain 36. Tensioning member 38 can be in the form of a threaded screw that can be rotated in one direction to increase the tension and can be rotated in the opposite direction to decrease the tension in the cable or chain 36.

Figure 4:
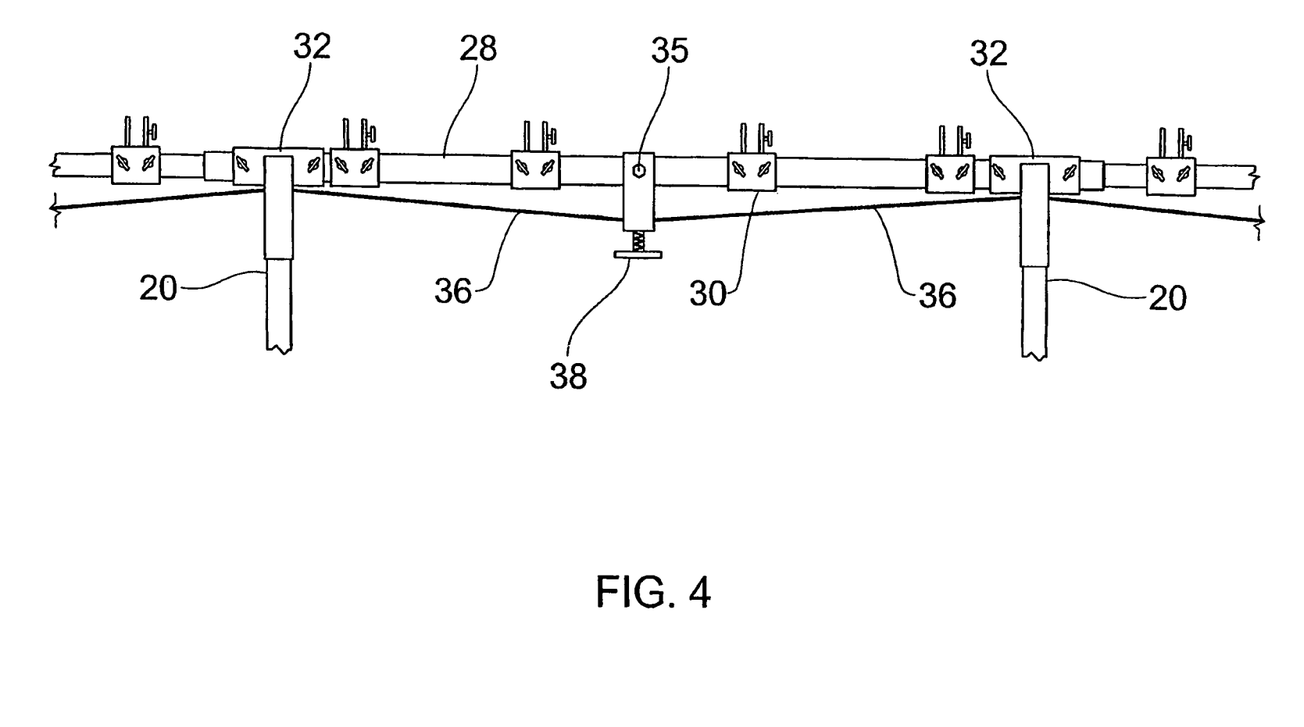
FIG. 4 shows further details of the lifting rail of FIG. 2.

FIG. 4 shows an elongate telescopic lifting rail 28 supported by a pair of hydraulic lifting rams 20 and tensioning member 38 located substantially centrally along the lifting rail 28 in between the two hydraulic lifting rams 20. Cables or chains 36 extend between the tensioning member 38 and the mounting brackets 32 and from the mounting brackets 32 to further tensioning members 38 (not shown). This enables different regions along the elongate lifting rail 28 to be pre-stressed according to the load to be applied to the particular region.

Figure 5:
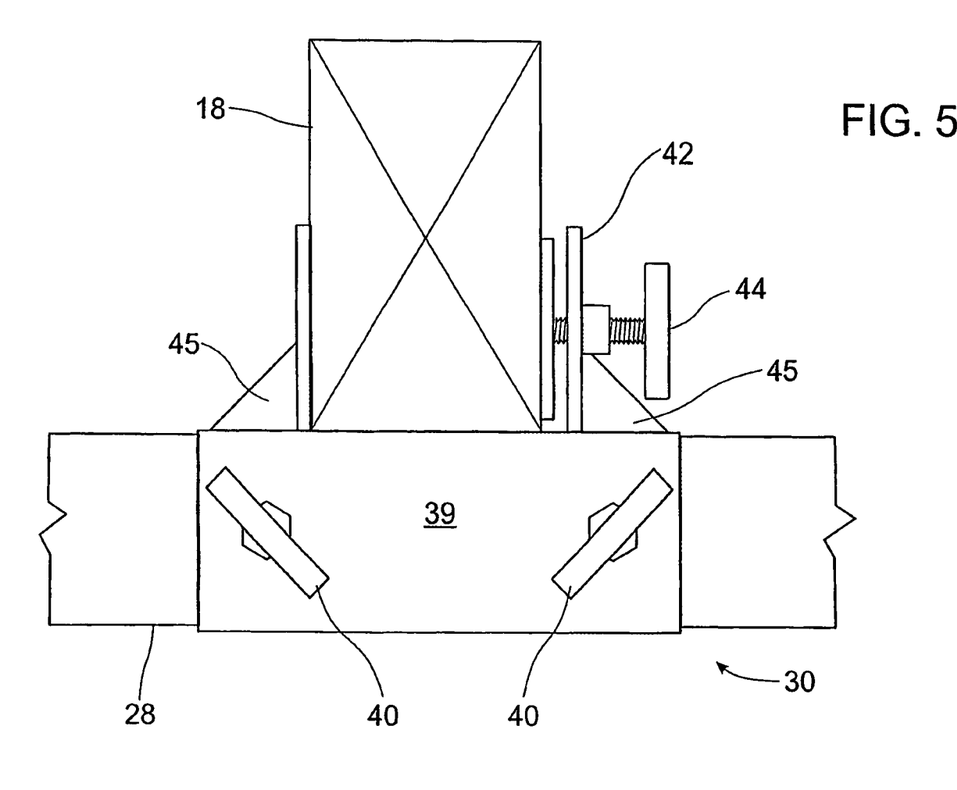
FIG. 5 is an enlarged view of a mounting element of the lifting rail of FIG. 2.

FIG. 4 also shows a plurality of mounting elements 30 spaced substantially evenly along the length of the elongate lifting rail 28. With additional reference to FIG. 5, mounting elements 30 comprise hollow member 39 for slidably receiving lifting rail 28. Mounting elements 30 are slidable along the length of the elongate lifting rail 28 and can be secured in the desired position by one or more clamping elements in the form of tensioning screws 40, although other known clamping elements can be employed. Mounting elements 30 receive and engage at least part of the construction element 14, such as a roof truss or floor joist 18, and the relevant part of the construction element is secured to the mounting element 30 in yoke 42 by one or more tensioning screws 44. The strength of mounting elements 30 can be increased by webs 45. Therefore, mounting elements 30 aid with construction of the construction element 14 substantially at ground level by providing accurate location points for the roof trusses, floor joists 18 or the like.

Figure 6:
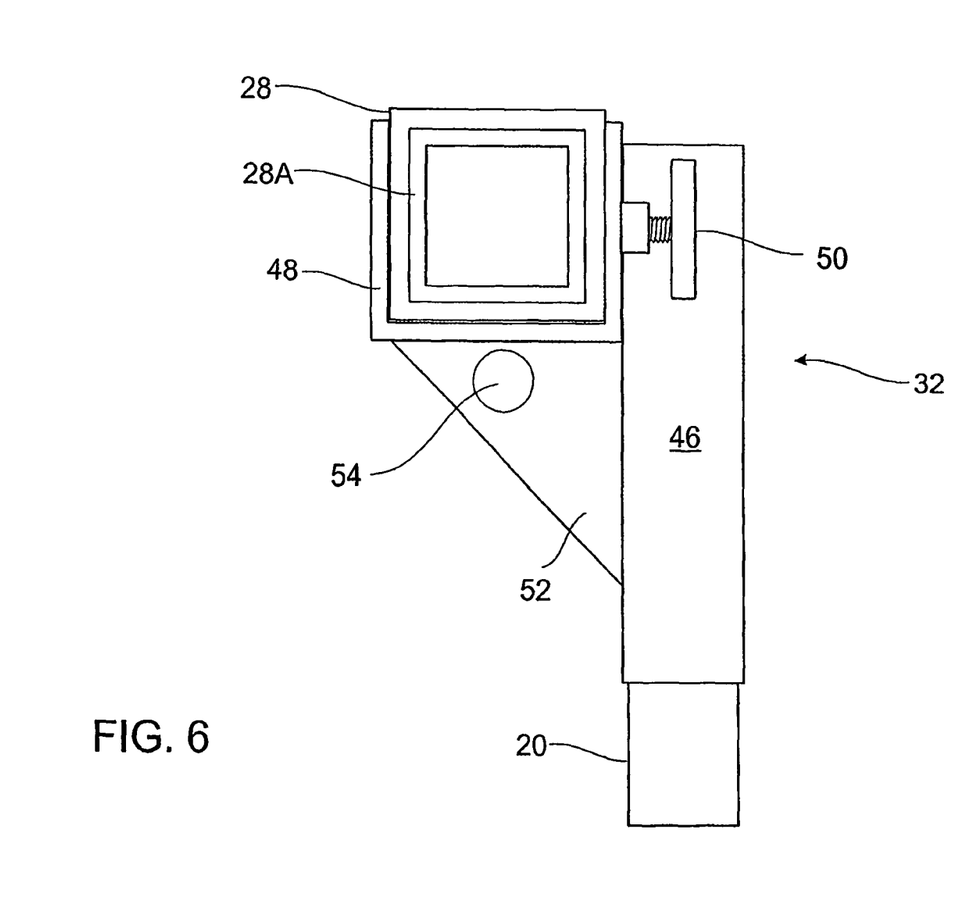
FIG. 6 is an end view of a mounting bracket and the lifting rail of FIG. 2.

Referring to FIG. 6, detachable mounting bracket 32 comprises a hollow member 46 stopped at one end for receiving an end of one of the hydraulic lifting rams 20 and a yoke 48 coupled to the hollow member 46 for receiving and engaging elongate lifting rail 28. In one embodiment, hollow member 46 is of a cross-section that does not permit rotation of the mounting bracket 32 with respect to the ram 20, otherwise this could cause inaccuracies and instability. If the hollow member 46 is of a cross-section that permits rotation, such as a circular cross-section, a locking member of any suitable means known in the art is used to prevent rotation of the mounting bracket 32 with respect to the ram 20. Locking member 50 in the form of a locking screw secures the lifting rail 28 in the yoke 48. Mounting bracket 32 also comprises a web 52 having an aperture 54 to which cables or chains 36 for pre-stressing the lifting rail 28 are attached by any suitable means known in the art. FIG. 6 also shows the telescopic nature of the lifting rails 28 according to this embodiment, wherein an inner rail 28A slides within lifting rail 28.

Figure 7:
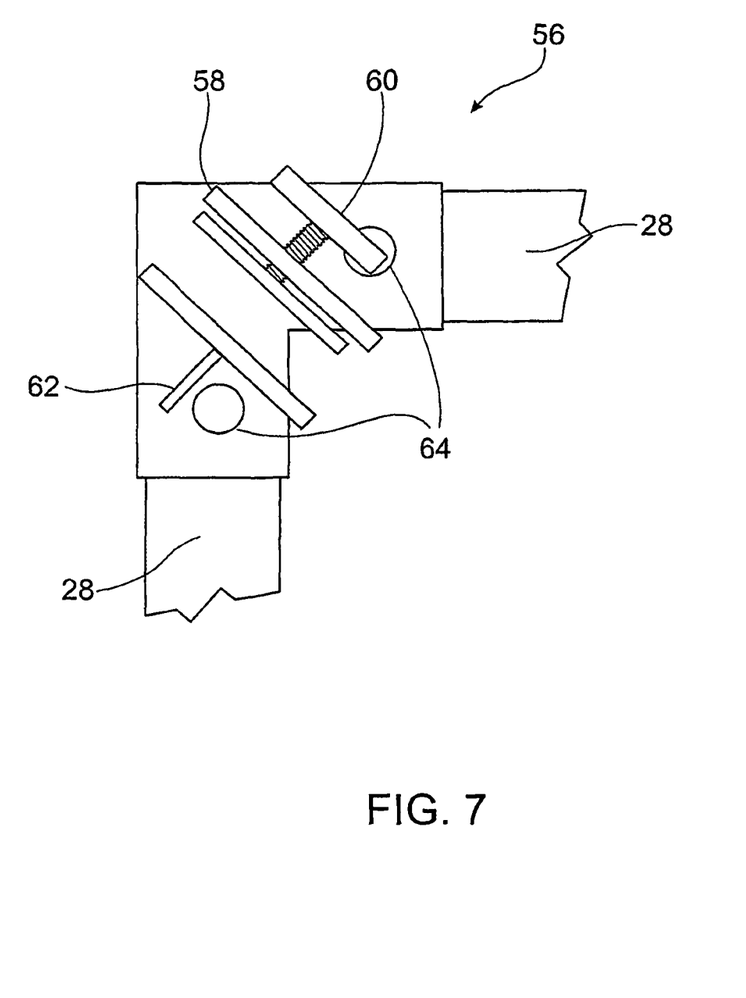
FIG. 7 is a plan view of a corner mounting element of the lifting rail of FIG. 2.

FIG. 7 shows a corner mounting element 56 for coupling between two substantially perpendicular lifting rails 28. Corner mounting element 56 comprises a hollow member 39 having two arms 57 abutting substantially at right angles to receive the lifting rails 28. Corner mounting element 56 also comprises a yoke 58 for receiving and engaging part of a construction element 14, such as a roof truss 18 or the like, which is secured in the yoke 58 by tensioning screws 60. Corner mounting element 56 also comprises web 62 for strengthening the yoke 58 and locking members in the form of locking pins 64 for securing substantially perpendicular lifting rails 28 to the corner mounting element 56. Another web can also be provided on the opposite side.

Figure 8:
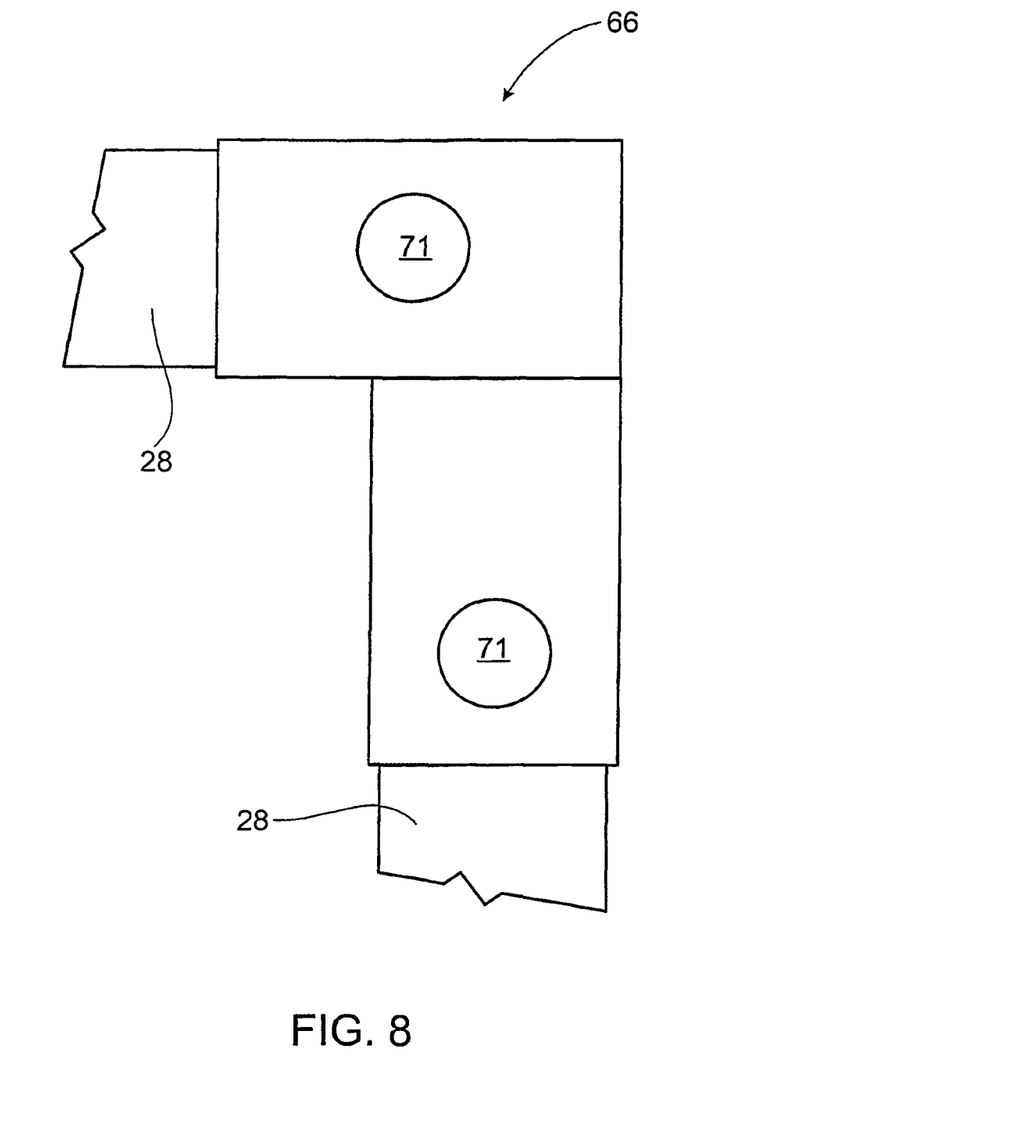
FIG. 8 is a plan view of a corner joining element of the lifting rail of FIG. 2.

Referring to FIG. 8, where two substantially perpendicular lifting rails 28 meet, whether it is at an internal or external corner, a corner joining element 66 is provided for joining the adjacent perpendicular ends of the lifting rails. Locking members, such as locking pins or locking screws (not shown) are used to secure the adjacent perpendicular lifting rails 28 in place via apertures 71.

Figure 9:
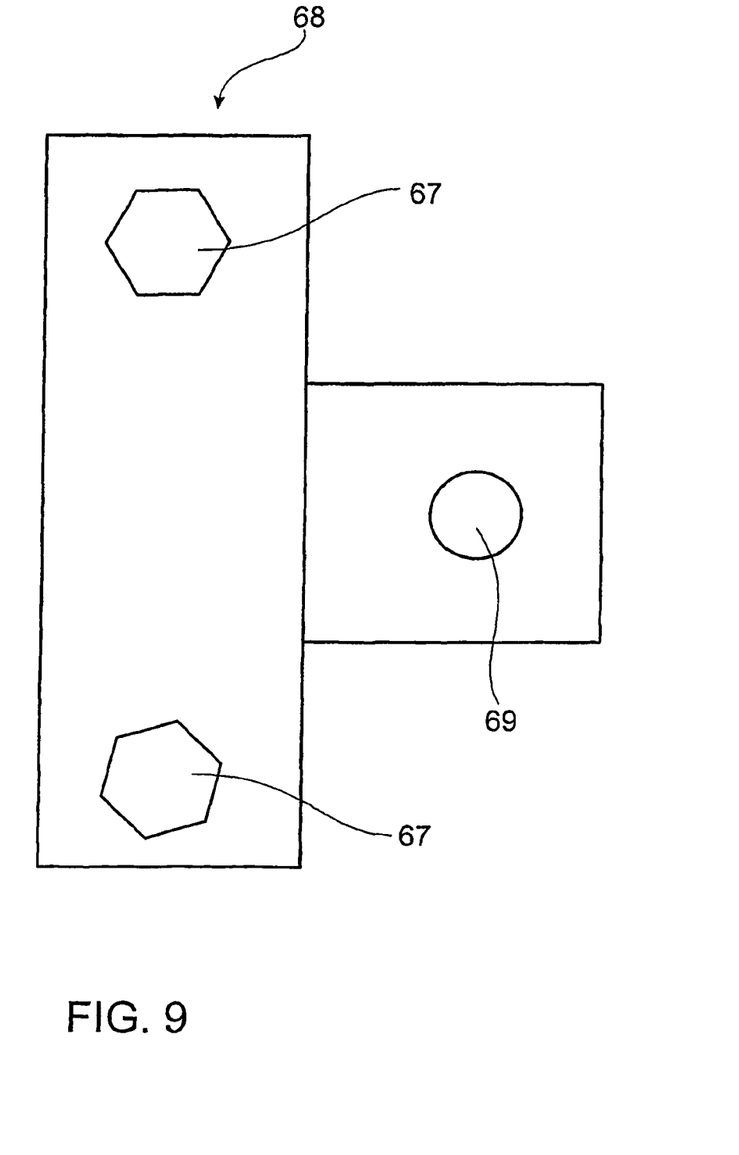
FIG. 9 is a plan view of a T-shaped joining element of the lifting rail of FIG. 2.

With reference to FIG. 9, where an end of a lifting rail 28 meets substantially perpendicularly with an intermediate point of an adjacent lifting rail, the end of one lifting rail is secured to the adjacent lifting rail with T-shaped joining element 68 using locking members, such as locking nuts 67 and a locking pin 69.

Figure 10:
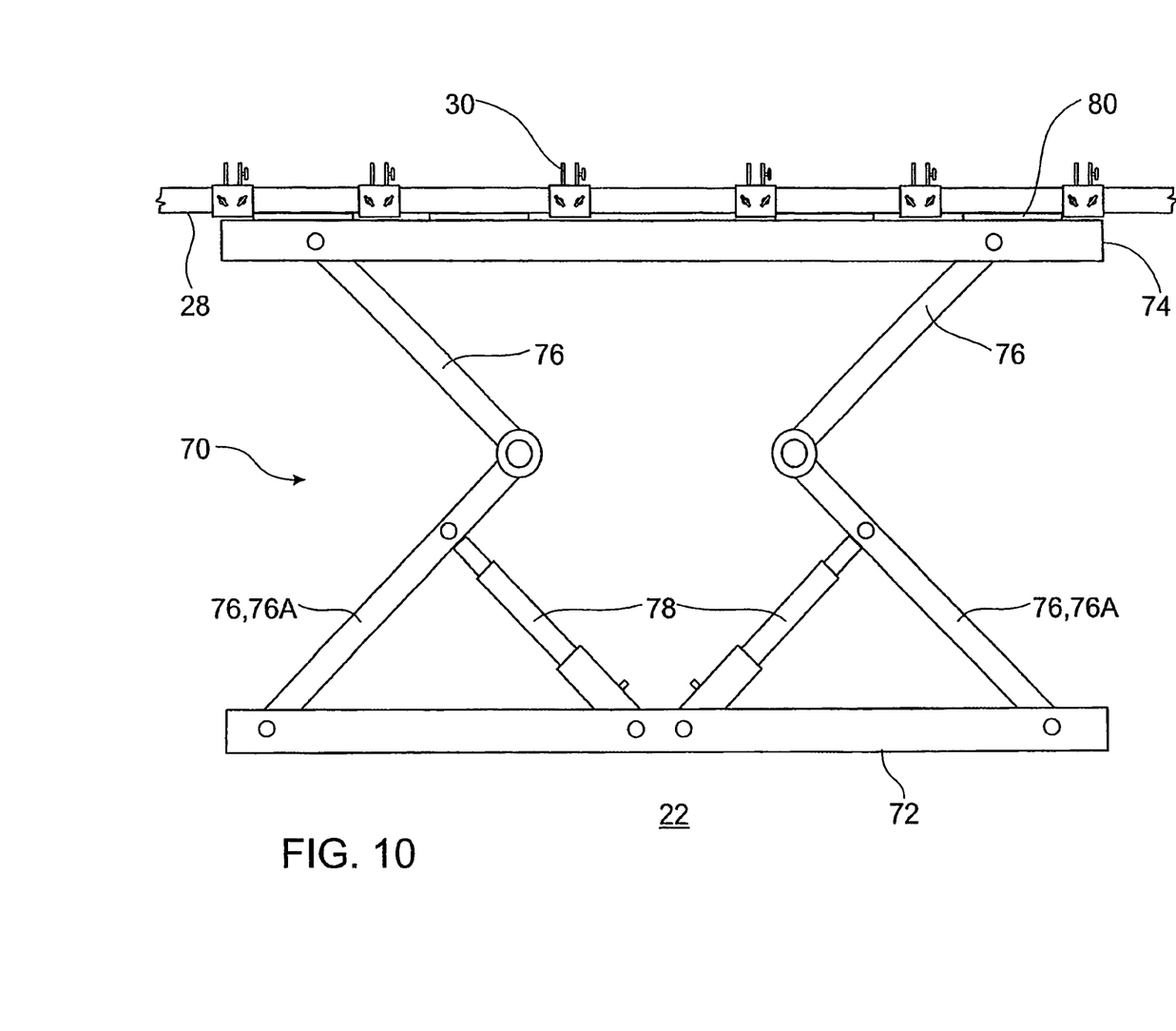
FIG. 10 is a side view of a scissor lift of the construction system of FIG. 1.

With reference to FIG. 10, the system 10 can further comprise one or more conventional scissor lifts 70 beneath each elongate lifting rail 28 to provide additional support and stability. Scissor lifts 70 comprise a base 72 abutting the foundation 22 and a table 74 abutting lifting rail 28. Base 72 and table 74 are substantially parallel and are pivotally coupled by hinged supports 76. The separation of the base 72 and table 74 is controlled by hydraulic rams 78 pivotally coupled between the base 72 and two of the supports 76A. In one embodiment, hydraulic rams 78 are operatively coupled to hydraulic pump 24 such that elevation of the table 74 of the scissor lift 70 is synchronized with the extension of the rams 20 to the prescribed height. Blocks 80 can be employed to allow clearance for the mounting elements 30 between the table 74 and the lifting rail 28.

Figure 11:
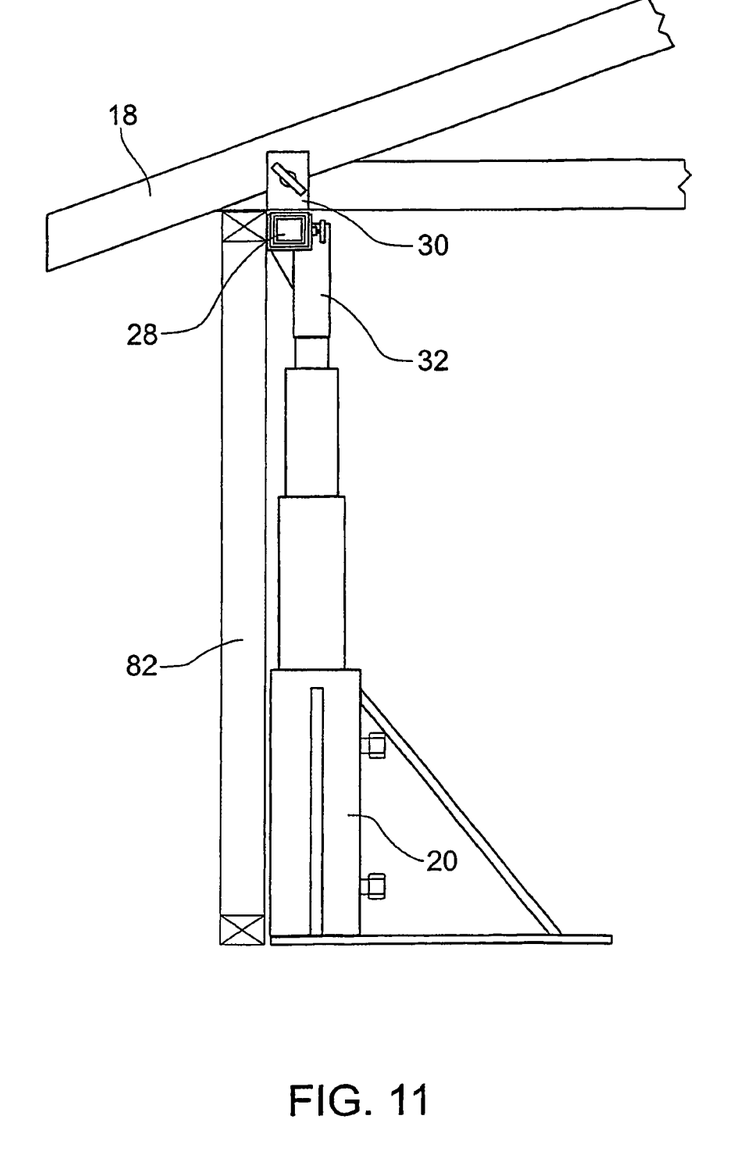
FIG. 11 is an end view of the construction system of FIG. 1.

FIG. 11 shows a side view of the construction system 10 comprising one of the hydraulic lifting rams 20 coupled to the lifting rail 28 via mounting bracket 32 with the lifting ram in an elevated position. The lifting ram 20 supports roof truss 18 via mounting element 30. FIG. 11 also shows a wall 82 that has been constructed after the construction element 18 in the form of a roof has been elevated to the prescribed height.

Figure 11A:
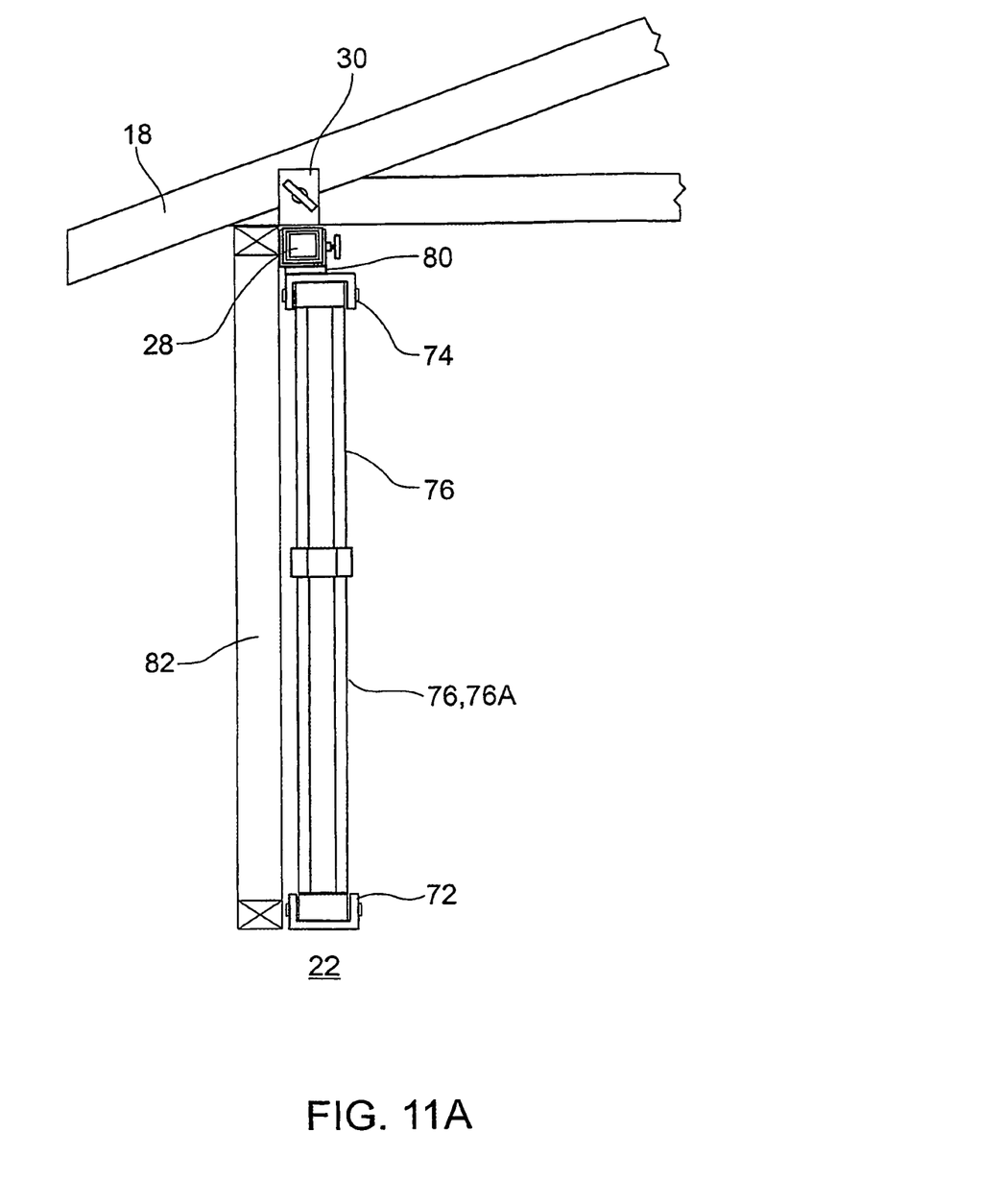
FIG. 11A is an end view of the construction system of FIG. 1 showing an end view of the scissor lift of FIG. 10.

FIG. 11A shows a side view of the construction system 10 similar to that in FIG. 11. However, FIG. 11A shows an end view of the scissor lift 70 in situ in an extended position in which table 74 is providing additional support to lifting rail 28.

Figure 12:
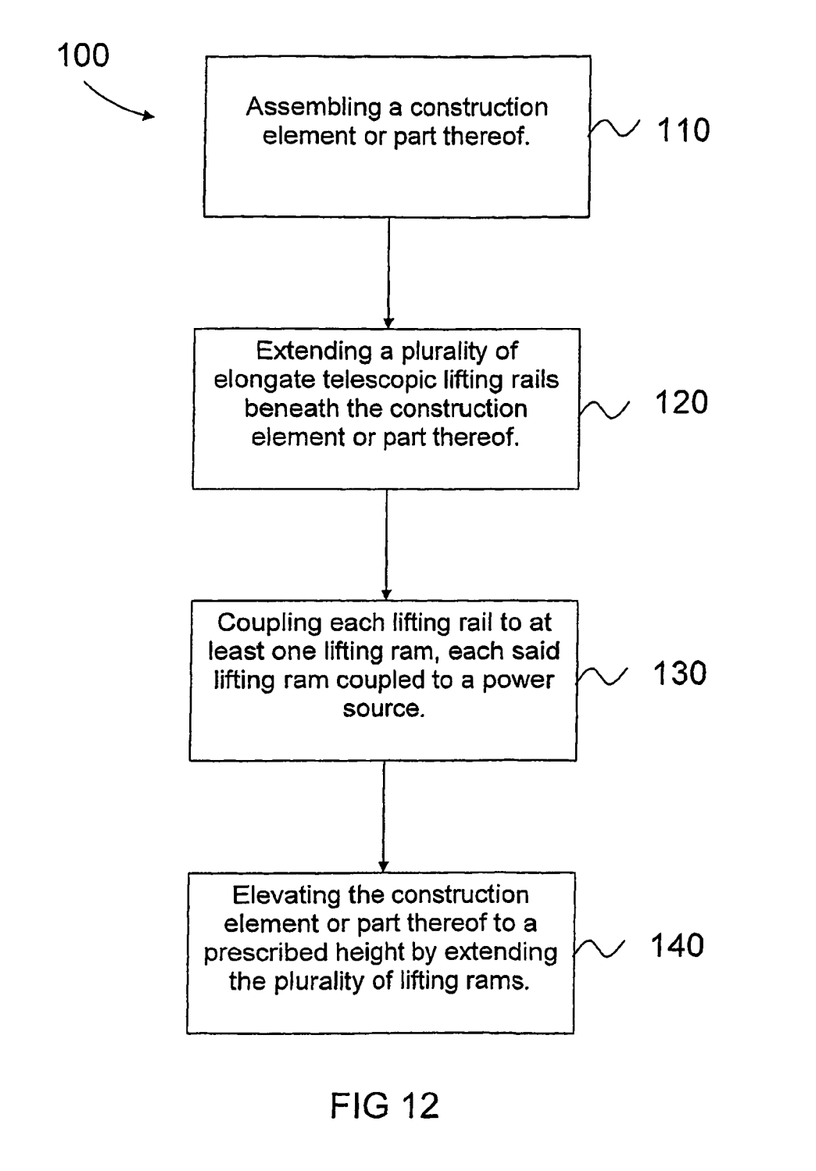
FIG. 12 shows a flowchart of a method of construction according to an embodiment of the present invention.

With reference to FIG. 12, a method 100 of construction according to an embodiment of the present invention includes step 110 of assembling a construction element 14 or part thereof. Step 120 includes extending a plurality of elongate lifting rails 28 beneath the construction element 14 or part thereof. In step 130, the method includes coupling each lifting rail 28 to at least one hydraulic lifting ram 20 of a plurality of hydraulic lifting rams. In step 140, the method includes elevating the construction element 14 or part thereof supported by the plurality of lifting rails 28 to a prescribed height using the plurality of hydraulic lifting rams 20.

Embodiments of the present invention can also include ratchet straps or other tying devices to secure a structure that has been elevated by the lifting rams 20 to the ground or a foundation or other secure structure. For example, where the construction elements 14 form a roof structure, ratchet straps or other tying devices can be used to secure the elevated roof structure and prevent damage, for example, due to high winds, until the remainder of the structure is built.

Whilst the present invention has been described with reference to a hydraulic lifting system, it will be appreciated that the present invention is not limited thereto. In alternative embodiments, the lifting system can be pneumatic, electrical or mechanical comprising pneumatic, electrical or mechanical lifting rams respectively. Consequently, the power source can be a pneumatic pump or a generator respectively. The assembly associated with such systems will vary accordingly.

It will be appreciated that the present invention is not limited to the construction element 14 being in the form of roof structures and the present invention is also applicable to other construction elements or parts thereof, such as, but not limited to, conventional floors, such as timber or concrete floors, mezzanine floors, concrete slabs, scaffolding, other surfaces, house levelling and other such applications. The mounting elements 30 for receiving and engaging part of the construction element 14 will therefore receive and engage the appropriate part of the construction element 14. For example, where the construction element is a floor, the mounting element can receive and engage a joist or frame of the floor. In another example, the construction element 14 can be in the form of scaffolding such that a scaffolding arrangement used on the outside of a building, for example, during construction or for cleaning purposes, can be raised and lowered as required by virtue of the lifting rams 20.

It will also be appreciated that the present invention is not limited by the number of mounting elements 30 provided on each lifting rail 28 nor by the number of lifting rails and/or scissor lifts 70 provided for lifting the construction element 14 or part thereof. Each application will have its own particular requirements for compliance with engineering and safety requirements.

Furthermore, the corner mounting element 56 can comprise hollow arms 57 at any suitable angle to receive lifting rails 28 according to an angle of adjacent construction elements 14 or parts thereof that require elevation.

Hence, the construction method and system of the present invention thus provides a solution to the aforementioned problems of the prior art by virtue of the elongate lifting rails 28 and mounting elements 30, which aid with construction of the construction element 14 substantially at ground level by providing accurate location points for the roof trusses, floor joists or the like and help maintain the 'trueness' of the construction element 14. The mounting elements 30 are movable along the length of the lifting rails, hence being adaptable to any building plan. The hydraulic lifting rams 20 extend to a significant height such that the extension struts of the prior art are not required. Nevertheless, the rams 20 are portable and can easily be moved around a particular site or between sites and heavy lifting gear is therefore not required. The elongate lifting rails 28 can be pre-stressed by the tensioning device 38 to accommodate large loads and avoid buckling under the load. The telescopic nature of the lifting rails 28 enables them to be adjusted to each application, yet minimized in length to maintain the portability of the system 10. Temporary bracing of the construction element is not required because the lifting rails 28, mounting elements 30, 56, mounting brackets 32 and joining elements 66, 68 contribute to the structural integrity of the construction element. The system and method of the present invention is also likely to reduce the number of workers required to erect a building because of the additional support and integrity provided by the system and the ease of operation. Construction times are also reduced. For example, once the system is installed, elevation of the construction element 14 can be achieved in as little as 15 minutes. Furthermore, since the system can be located about the perimeter of the foundation and can be tailored to each site, the system and method of the present invention does not require extra or additional space to be accommodated.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A construction system for erecting a building, the construction system comprising:
    a plurality of lifting rams operatively coupled to a power source;
    at least one elongate, telescopic lifting rail, each lifting rail coupled to at least one lifting ram of the plurality of lifting rams;
    at least one mounting element slidably received on each of the at least one lifting rails, each mounting element configured and arranged to receive and secure a part of a construction element of the building;
    a clamping element to secure each mounting element in a selected position along the respective lifting rail; and
    a controller operatively coupled to the power source to control the lifting rams to elevate the construction element to a prescribed height.

2. The system as claimed in claim 1, further comprising a detachable mounting bracket to couple each lifting rail to at least one lifting ram.

3. The system as claimed in claim 2, said mounting bracket comprising:
    a hollow member having a stopped end for receiving an end of the lifting ram; and
    a yoke coupled to the hollow member for receiving the elongate, telescopic lifting rail, said yoke preventing rotation of the lifting rail within the yoke.

4. The system as claimed in claim 3, the mounting bracket further comprising a web extending between the hollow member and the yoke.

5. The system as claimed in claim 4, wherein the web comprises an aperture therethrough to which cables or chains for pre-stressing at least part of the lifting rail prior to receiving a load can be coupled.

6. The system as claimed in claim 1, further comprising a tensioning device, wherein the tensioning device comprises at least one cable or chain extending between two separated points along the length of the lifting rail.

7. The system as claimed in claim 6, wherein the tensioning device comprises a tensioning member intermediate the two separated points for varying tension in the at least one cable or chain.

8. The system as claimed in claim 1, further comprising a tensioning device, wherein the tensioning device is movable along a length of the lifting rail.

9. The system as claimed in claim 1, wherein the construction element is one or more of the following: a roof structure or part thereof, a floor structure or part thereof.

10. The system as claimed in claim 1, wherein the lifting rams are one of the following: hydraulic, pneumatic, electrical, mechanical.

11. The system as claimed in claim 1, wherein the power source is one of the following: a hydraulic pump, a pneumatic pump, a generator.

12. The system as claimed in claim 1, further comprising one or more scissor lifts beneath one or more of the lifting rails.

13. The system as claimed in claim 1, wherein the one or more scissor lifts are operatively coupled to the power source such that elevation of a table of each scissor lift is synchronized with elevation of the plurality of lifting rams.

14. The system as claimed in claim 1, wherein said mounting element comprises:
    a hollow member for slidably receiving the elongate, telescopic lifting rail;
    the clamping element for securing the hollow member to the elongate, telescopic lifting rail; and
    a yoke coupled to the hollow member for receiving part of the construction element.

15. The system of claim 14, wherein the hollow member comprises a pair of hollow arms abutting at an angle to respectively receive an elongate, telescopic lifting rail.

16. The system as claimed in claim 1, wherein each lifting rail further comprises a tensioning device to pre-stress at least part of the lifting rail prior to receiving a load.

* * * * *